United States Patent [19]
Chou

[11] Patent Number: 4,875,028
[45] Date of Patent: Oct. 17, 1989

[54] WARNING TRIANGLE

[76] Inventor: An-Chuan Chou, No. 12, Yung An St., Tainan, Taiwan

[21] Appl. No.: 841,205

[22] Filed: Mar. 19, 1986

[51] Int. Cl.$^4$ .............................................. B60Q 1/00
[52] U.S. Cl. ..................... 340/473; 116/63 T; 40/903; 362/367; 362/258
[58] Field of Search ...................... 340/74, 84, 87, 90, 340/107, 114 B, 114 R, 181 R; 40/556, 588, 591, 903; 404/6, 10; 350/97, 101, 102; 116/63 R, 63 P, 63 T

[56] References Cited

U.S. PATENT DOCUMENTS

| | | | |
|---|---|---|---|
| 2,932,018 | 4/1960 | Schwartz | 340/90 |
| 3,372,503 | 3/1968 | Weeks | 40/591 |
| 3,936,967 | 2/1976 | Davis | 40/592 |
| 4,157,531 | 6/1979 | Mont | 340/107 |
| 4,192,090 | 3/1980 | Seth | 340/107 |
| 4,613,847 | 9/1986 | Scolari et al. | 340/84 |
| 4,633,215 | 12/1986 | Anders et al. | 340/84 |

FOREIGN PATENT DOCUMENTS

| | | | |
|---|---|---|---|
| 2160899 | 6/1972 | Fed. Rep. of Germany | 340/114 R |
| 1294941 | 4/1962 | France | 116/63 P |
| 1418847 | 10/1965 | France | 340/114 R |
| 1465186 | 11/1966 | France | 340/90 |
| 1430293 | 7/1967 | France | 340/114 R |
| 2221927 | 9/1974 | France | 340/114 R |
| 2041430A | 9/1980 | United Kingdom | 340/114 R |

*Primary Examiner*—Joseph A. Orsino
*Assistant Examiner*—Brent A. Swarthout
*Attorney, Agent, or Firm*—Morton J. Rosenberg

[57] ABSTRACT

A triangle for stalled or disabled vehicles, comprising an outer triangular portion which is red and reflective which is placed on a structure, an inner triangular portion which is yellow and which can be lit up by two light bulbs which are on the inside of the structure, a battery chamber, and a cigarette-lighter D.C. adapter which has a line connected to a lighting circuit and which when not in use can be placed in an adapter storage chamber which is part of the structure, with the line from the D.C. adapter to the lighting circuit winding automatically, with a D.C. adapter cord securement switch, with a lighting selection switch allowing for either continuous or blinking light, and magnets on the back and bottom faces.

1 Claim, 5 Drawing Sheets

WARNING TRIANGLE

BACKGROUND OF THE INVENTION

This invention relates to warning triangles for larger vehicles such as cars, trucks, vans and buses. Previous designs have several drawbacks. Firstly, previous designs may not be highly visible in foggy weather, or at night, especially if the oncoming vehicle does not have its lights turned on, since conventional triangles only *reflect* light from the oncoming vehicle.

Another problem with conventional triangles is that they are easily blown over in windy weather, especially if the wind is blowing on the back face of the reflective triangle, or if the road is not flat.

A third problem is that while being stored in a car's trunk, conventional triangles may slide and bounce around. This creates unwanted noise and could possibly scratch up the inside of the vehicle and damage the reflective triangle.

The present invention seeks to mitigate and obviate the above-mentioned drawbacks.

SUMMARY

A primary objective of this invention is to provide a reflective safety triangle with increased warning efficiency in all weather conditions.

Another objective of this invention is to provide a warning triangle which will not easily fall or be blown over while in use.

A further objective of this invention is to provide a warning triangle which will not be noisy to carry in a trunk.

Further objectives and advantages of the present invention will become apparent as the following description proceeds, and the features of novelty which characterize the invention be pointed out with particularity in the claims annexed to and forming a part of this invention.

DETAILED DESCRIPTION OF THE PREFERRED EMBODIMENT

Figure 1:
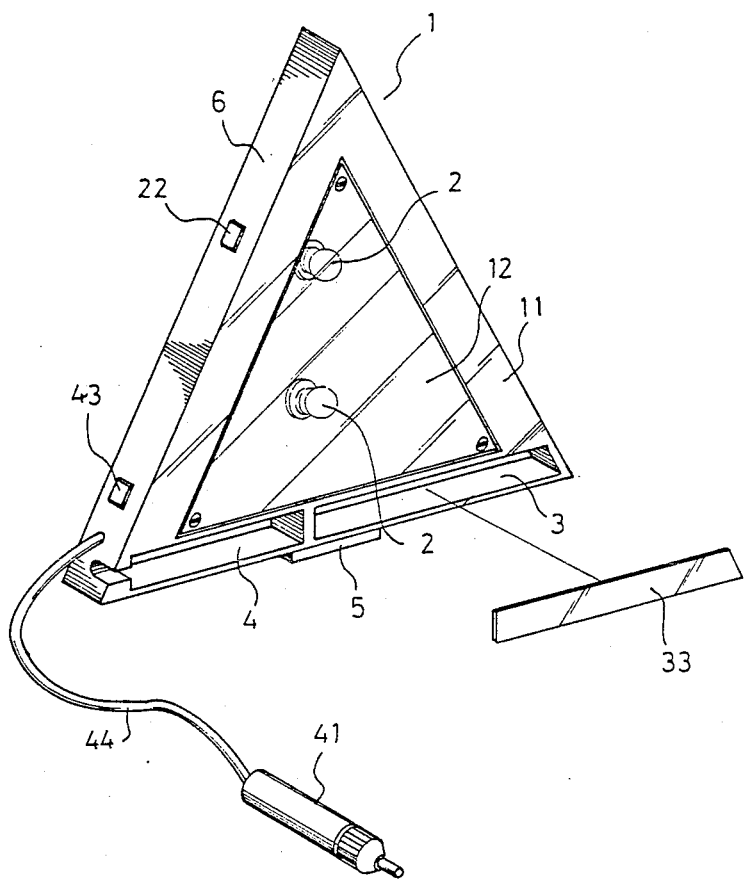
FIG. 1 is a perspective view of the present invention.

Referring to FIG. 1, it can be seen that the warning triangle structure 1 comprises an outer reflective triangle 11, an inner reflective triangle 12, at least two lights 2, a battery chamber 3, a plug storage chamber 4 and a D.C. cigarette-lighter adapter plug 41, all of which are an integral part of, or are secured to, the support structure 6.

On the frame of the warning triangle there is a power source selection switch 32. This switch 32, in conjunction with the circuit shown in FIG. 3, determines whether the power for the lights 2 comes from dry cell batteries or the cigarette-lighter D.C. adapter plug 41 (which of course gets its power from the vehicle's battery via the cigarette lighter).

The battery chamber 3 has a battery chamber cover 33 which secures dry cell batteries in place and which doubles as part of the outer reflective triangle 11. The outer reflective triangle 11 of the present invention is the conventional red color, but the inner warning triangle 12 of the present invention is a reflective yellow. This yellow inner triangle 12 provides greater contrast to the red reflectors on the outer triangle 11, thereby increasing the warning efficiency of the present invention over previous reflective triangles. Moreover, the inner triangle 12 is translucent so as to allow lights 2 to illuminate the inner triangle 12, thereby providing even better visibility of the overall warning triangle 1. This feature is especially useful in cloudy, misty or dark conditions.

Figure 2:
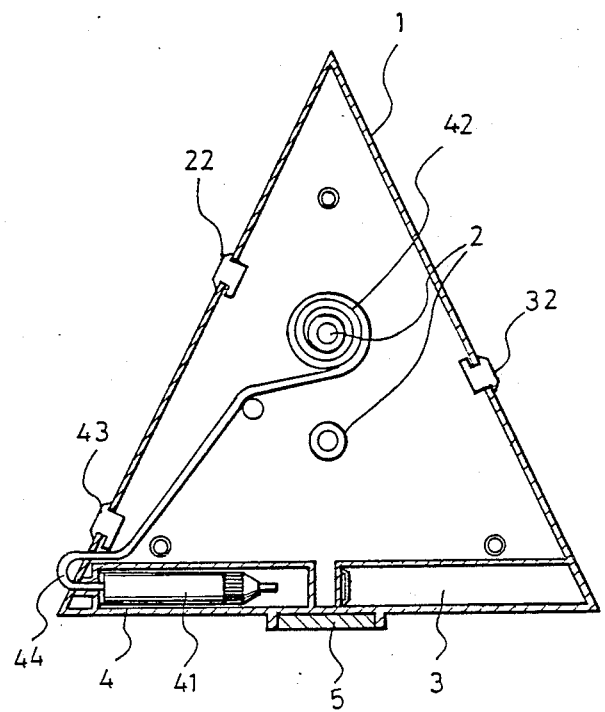
FIG. 2 is a cross-sectional view as seen from the back side of the present invention.

Referring to FIG. 2, it can be seen that opposite the power source selection switch 32 is a blink switch 22, which can be used to toggle the lighting type from continuous to blinking light or vice-versa. On the same face of the triangle structure as the blink switch 22 is an automatic winding switch 43 for the cord to the cigaretter-lighter D.C. adapter plug. When the automatic winding switch 43 is pushed up toward the apex of the triangle, the cord 44 is free either to be pulled out or to be automatically wound in by a circular spring 42. When the automatic winding switch 43 is pushed down, the cord 44 is secured for either storage or for actual use.

Figure 3:
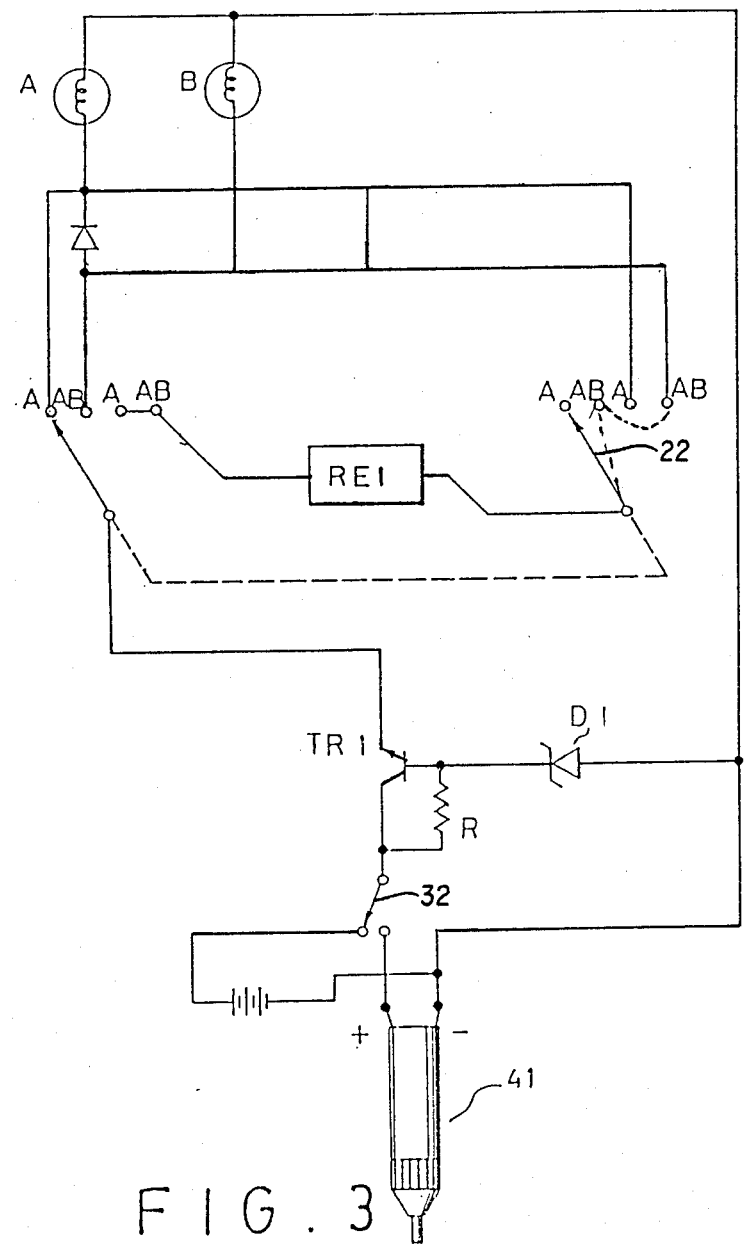
FIG. 3 is a circuit diagram of the present invention.

The details of the electrical circuit of the present invention are shown in FIG. 3. The circuit comprises a Zener diode which is used to stabilize the voltage being sent to the lamps, two lamps, a relay which determines the lighting type (blinking or constant) of the lamps, and the D.C. adapter.

Figure 4:
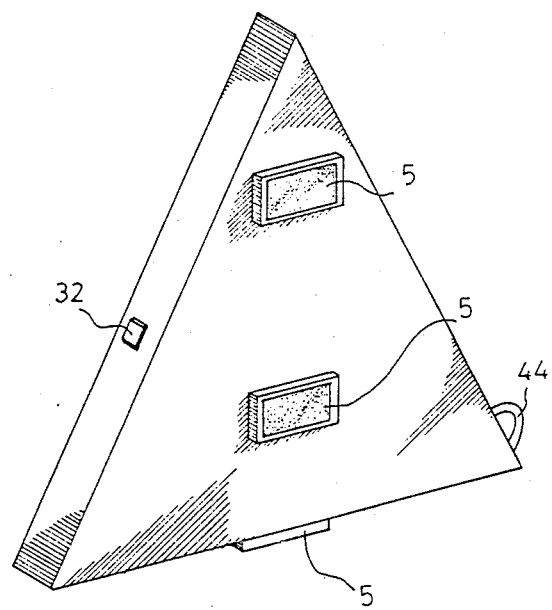
FIG. 4 is an alternate perspective view of the present invention as seen from the back side of the present invention.

Referring to FIG. 4, it can be seen that there are magnets 5 on the back face and the base of the triangle. These magnets 5 are used to secure the warning triangle of the present invention to the vehicle in emergency situations. Because the present invenion can be secured to any metal part of the vehicle itself, there is little danger of the triangle blowing over or not being stable as in conventional reflective triangles due to the bumpy surface of the road. An added advantage of the magnets 5 is that the present invention can be secured to the inside surface of the trunk of the car by the magnets 5, or to some other metal object inside the trunk during storage, thereby eliminating unwanted rattling and sliding of the triangle 1.

Figure 5:
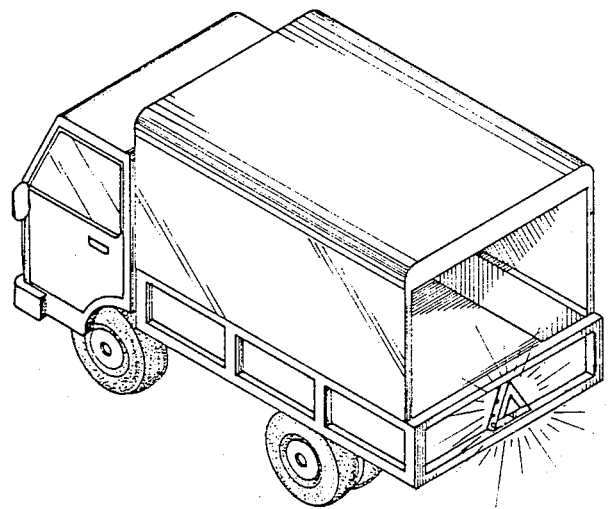
FIG. 5 is a working view of the present invention.

FIG. 5 shows a working view of the present invention, with the invention shown securely fixed onto the tailgate of a truck by the magnets 5 (shown in FIG. 4).

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A warning triangle 1, comprising a triangle structure with an open side, said triangle structure having a lower portion wherein there is formed a plug storage chamber, a battery chamber, and a securable cover hinged to the battery chamber;

an extension cord connected at one end to an interior wall of said triangle structure;

an adapter plug connected to the other end of said extension cord;

an outer triangular plate mounted on the open side of said triangle structure, said outer triangular plate having a triangular opening at the central part thereof;

an inner triangular plate mounted on the triangular opening of said outer triangular plate, said inner triangular plate being translucent in color;

spring means disposed within said triangle structure coupled to said extension cord for retraction and winding thereof;

an automatic winding switch mounted on said triangle structure for securing a predetermined length of said extension cord while in use;

a plurality of light bulbs switchably coupled to a power source, said light bulbs disposed within said triangle structure for illumination of said inner triangular plate;

means for controlling said light bulbs to give continuous or blinking light; and, magnets provided on bottom and back sides of said triangle structure for allowing said warning triangle to be conveniently secured on any metal part of a vehicle.

* * * * *